United States Patent [19]

Pearce

[11] Patent Number: 4,545,716

[45] Date of Patent: Oct. 8, 1985

[54] HAY BALE FEEDER

[76] Inventor: Arthur W. Pearce, Weering, Victoria, Australia

[21] Appl. No.: 612,425

[22] Filed: May 21, 1984

[30] Foreign Application Priority Data

May 24, 1983 [AU] Australia ............... PF9506

[51] Int. Cl.$^4$ ........................... A01D 87/12
[52] U.S. Cl. ................... 414/24.6; 414/757
[58] Field of Search ............ 414/24.5, 24.6, 757; 242/86.5 R, 86.52

[56] References Cited

U.S. PATENT DOCUMENTS

| 3,874,609 | 4/1975 | Larson | 414/24.6 |
| 4,078,733 | 3/1978 | Popiolek | 414/24.6 X |
| 4,390,312 | 6/1983 | Skeem | 414/24.6 |
| 4,443,146 | 4/1984 | Duncan | 414/24.6 |

FOREIGN PATENT DOCUMENTS

| 40936 | 10/1978 | Australia . | |
| 509890 | 4/1980 | Australia . | |
| 2556234 | 6/1977 | Fed. Rep. of Germany | 414/24.6 |
| 2715577 | 10/1978 | Fed. Rep. of Germany | 414/24.6 |
| 2048211 | 12/1980 | United Kingdom | 414/24.6 |

Primary Examiner—Leslie J. Paperner
Attorney, Agent, or Firm—Littlepage & Webner

[57] ABSTRACT

A hay bale feeder comprises a cradle having opposed end plates and side formed by angularly disposed conveyors movable laterally relative to the longitudinal axis of the cradle. Each conveyor comprises a pair of substantially parallel endless chains carried by sprockets on respective upper and lower shafts extending between the end plates, and a plurality of slats or bars are fixed to the chains for movement therewith. The slats or bars have spikes extending therefrom to engage in and remove hay from a bale carried in the cradle. The conveyors are driven in synchronism so that upper runs of the conveyors move in the same general lateral direction. Guide plates support the conveyor chains between the respective upper and lower shafts.

10 Claims, 3 Drawing Figures

HAY BALE FEEDER

BACKGROUND OF THE INVENTION

This invention relates to a hay bale feeder and relates particularly to an improved feeder for feeding out hay, straw or the like from bales and more particularly from round bales.

Round bales of hay, straw or the like are formed by rolling the hay, etc., into a substantially cylindrically shaped bale which may have a diameter of up to two meters or more. Various machines are available for forming such bales. Depending on the type of machine used, the bales may be formed an even density of material throughout the bale, or with a relatively dense core of tightly packed material with the outer layers of material either as tightly packed or less dense, or the bale may be formed with a relatively low density core and the outer layers of material more tightly packed to form a relatively dense outer layer.

When feeding out material from such bales, it is necessary to break down the round bales or unroll the bales to form a mat of feed. Several machines have been proposed for feeding hay from a round bale or for unrolling such round bales, but these machines have a number of drawbacks, being either complex and relatively expensive or being unable to evenly feed all the hay from the round bales.

BACKGROUND ART

One type of apparatus which is described in Australian Pat. No. 509,890 has a pair of spikes which engage in the ends of the round bale and supports the bale on a horizontally disposed conveyor mounted on a trailer which is arranged to be towed behind a tractor or other vehicle. The conveyor is movable in the longitudinal direction of the trailer and carries upstanding spikes, teeth or bars which engage with the outer surface of the bale and act to feed hay from the bale, when the conveyor is moved, to the back of the trailer where the hay falls to the ground.

With such apparatus, however, it is necessary to provide means to engage the supporting spikes in the ends of the bale and it is necessary that the bale be mounted with the correct orientation to enable the hay layers to be unrolled correctly.

In another form of apparatus described in Australian patent application No. 40936/78, a horizontally disposed, transversely movable conveyor carrying teeth, spikes or bars supports the hay bale in a trough or cradle and additional flail rollers are provided on the sides of the trough or cradle to assist in rotating the bale within the trough or cradle, the conveyor and flail rollers acting to flail hay from the hay bale. With this apparatus, however, it has been found that hay bales having a relatively dense core are not completely fed from the cradle, and movement of the flail rollers and conveyor tends to cause the hay bale to move out of the cradle.

It is therefore an object of the present invention to provide improved hay bale handling apparatus for feeding out hay or the like from bales, which apparatus can be used with bales of any shape and type and which feeds out all the hay from the bale.

It is a further object of the present invention to provide improved bale handling apparatus wherein the hay bale remains in contact with the hay feeding means until all the hay has been fed from the bale.

SUMMARY OF THE INVENTION

According to one aspect of the invention there is provided a bale feeder comprising a cradle means, support means to support the cradle means above the ground, said cradle means including two conveyor means angularly disposed relative to each other and each including upper and lower shaft means extending generally longitudinally of the cradle means, endless chain or belt means extending about the upper and lower shaft means and a plurality of slat means carried by the chain or belt means, the lower shaft means of each conveyor means being spaced apart a distance of between about 150 mm and 500 mm, drive means for driving each conveyor means so that both conveyor means move in the same lateral direction relative to the longitudinal axis of the cradle means, and flail means on at least some of the slat means to engage the surface of a bale carried in the cradle.

In one preferred form, the apparatus for feeding out hay from bales comprising a cradle, wheel means supporting the cradle above the ground, the cradle being formed with two sides having an included angle of between 100° and 140°, each side being formed with a conveyor having a pair of coaxial sprocket means at or adjacent an outer edge of the respective side and a second pair of coaxial sprocket means spaced inwardly from the outer edge and aligned with the outer sprocket means, chain or belt means engaged with aligned sprocket means, and a plurality of bars or slats extending between the chain or belt means, the respective inner sprocket means of each conveyor being spaced apart a distance of between 150 mm and 500 mm, drive means for driving each said conveyor so that both conveyors move in the same lateral direction relative to the cradle axis, and flail means on the bars or slats to engage the surface of a bail carried in the cradle.

Preferably, each conveyor defines an included angle of between 110° and 140° and the axes of the respective inner sprockets are separated by a distance of between 300 mm and 400 mm. It has been found that the angle between the conveyors and the spacing thereof is relatively important in providing apparatus which operates most efficiently and retains a hay bale within the cradle until all the hay has been distributed.

In one form, the conveyors are curved to further improve operational efficiency by fully supporting a bale whilst reducing any tendency for a bale to ride over the top of one side.

Preferably, the cradle is supported by a pair of wheels at one end thereof and a drawbar is provided at the opposite end for towing by a tractor or other vehicle. Alternatively, the cradle may contain linkage means so as to be carried and supported by a tractor or it may form part of a self-propelled implement.

In order that the invention is more clearly understood, two embodiments thereof will now be described with reference to the accompanying drawings.

DESCRIPTION OF PREFERRED EMBODIMENTS

Figure 1:
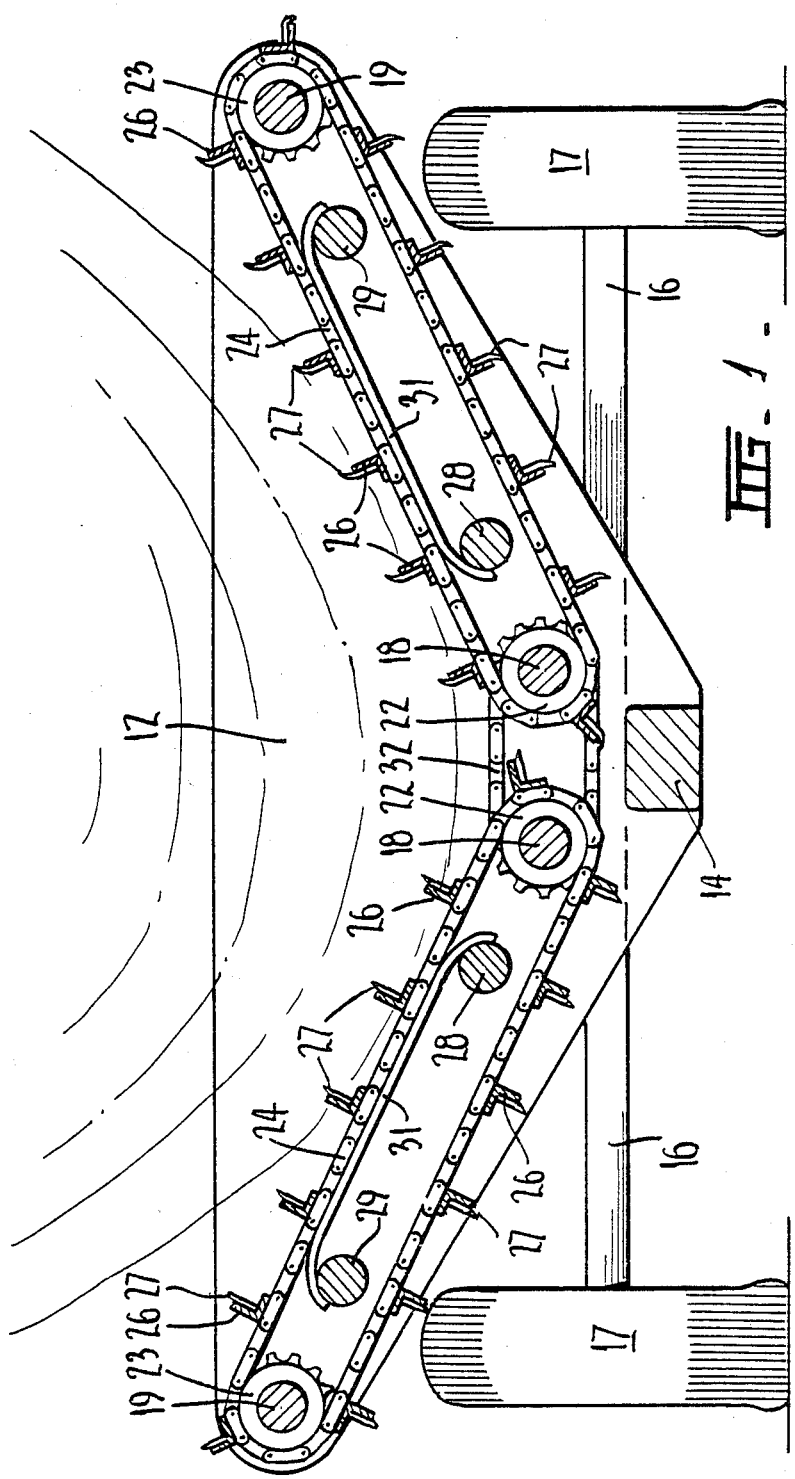
FIG. 1 is a sectional end elevational view of apparatus according to the invention.
Figure 2:
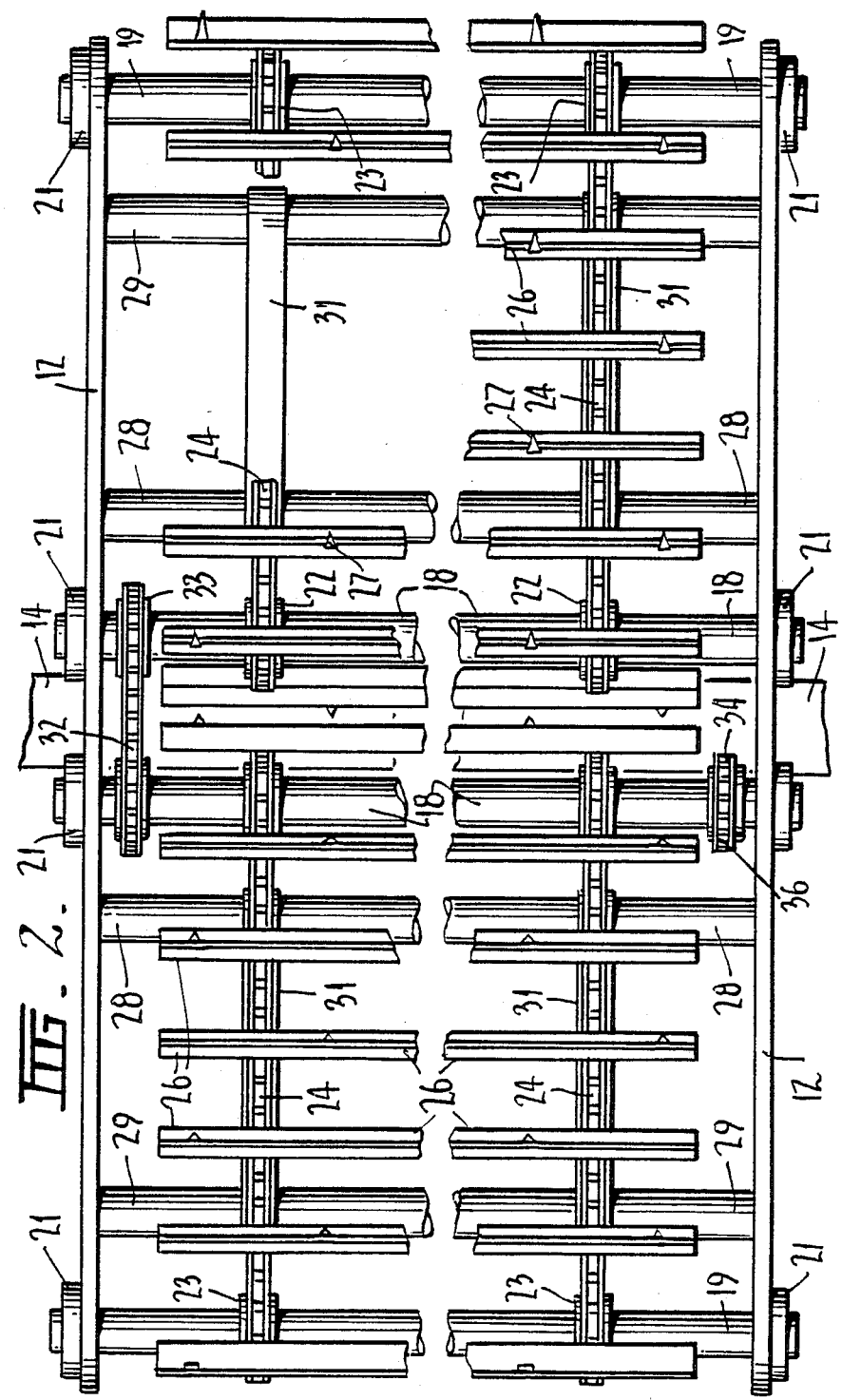
FIG. 2 is a top plan view, partly cut away, of the apparatus of FIG. 1.

The bale feeding apparatus of the embodiment illustrated in FIGS. 1 and 2 comprises a pair of spaced end plates 12 mounted on a longitudinally extending chassis member 14 which carries an axle 16 and wheels 17 at one end thereof. A draw bar is fitted to the chassis member 14 at the opposite end to enable the apparatus to be towed by a tractor or the like.

The end plates 12 carry bearing blocks 21 which support two pairs of longitudinally extending inner and outer shafts 18 and 19, respectively. Each shaft 18 and 19 carries a pair of chain sprockets 22 and 23, respectively, the sprockets 22 on the inner shafts 18 being aligned with the sprockets 23 on the outer shafts 19.

Each aligned pair of sprockets carries an endless chain 24, which is preferably a girder chain designed for conveyor systems and the like.

A plurality of longitudinally extending angle iron bars or slats 26 are secured to and extend between each parallel pair of chains 24, the combination of the chains 24 and slats 26 forming a conveyor system on each side of the apparatus. The angle iron slats 26 are secured to each chain so that one leg of the angle extends outwardly, and a plurality of spikes or teeth 27 are welded to each, or selected slats 26 to extend upwardly therefrom.

Support bars 28 and 29 extend longitudinally between the end plates 12 on each side of the apparatus, each pair of support bars 28 and 29 passing between the upper and lower runs of the chains 24. Guide members 31 extend between each pair of support bars 28 and 29 beneath the upper run of each chain 24 and act to support and guide movement of the upper run of chain as it moves between the upper and lower sprockets. The guide members 31 may comprise guide plates formed of metal, or webbing or other material which is held under tension between the support bars 28 and 29.

The two inner shafts 18 are interconnected by a further chain 32 which passes around sprockets 33 on each inner shaft 18 adjacent one end thereof. At the opposite end of one of the inner shafts 18, a further chain sprocket 34 is engaged by a chain 36 which passes upwardly from a hydraulic motor (not shown) mounted on the chassis member 14 beneath the conveyors. The hydraulic motor may receive a supply of hydraulic fluid either from the hydraulic system of a towing tractor or from a separate hydraulic pump.

It will be seen that, when the hydraulic motor operates to move the driven inner shaft 18, both conveyors are driven so as to move in the same lateral direction. The planes of the respective conveyors preferably defines an angle of approximately 110° to 120° which, it has been found, is suitable for carrying a hay bale and for stripping hay therefrom without the bale being moved over one side of the apparatus.

It is also preferred that the inner shafts 18 are separated a distance of approximately 340 mm which appears to be an optimum distance for maintaining the hay bale within the cradle formed by the conveyors and for stripping hay therefrom by movement of the conveyors when the conveyors are disposed at the correct angle.

When the hydraulic motor operates, the slats 26 carried by the chains 24 are caused to move in a direction toward one side of the apparatus. The movement of the slats 26 together with the spikes 27 thereon act to roll the hay bale located in the cradle and, at the same time, to strip material therefrom and feed that material either through the gap between the inner shafts 18 or over the outer shaft 19 on the side towards which movement occurs. It has been found that the apparatus of this invention is able to completely feed out all the hay from various forms of hay bales and even those having a hard core are totally fed out without the bale or the core being moved from its position in the cradle.

It will also be appreciated that it does not matter which way around the hay bale is located in the cradle as the hydraulic motor can be reversed to cause the conveyors to move in either direction depending on which direction is required for unrolling of the hay in the bale.

In a preferred form of the invention, the apparatus is made in a knock-down form whereby the chassis member 14, end plates 12, axle 16, inner and outershafts 18, 19 and support bars 28 and 29 can all be separated from each other and crated for transport. The chains 24 and slats 26 can also be disassembled, if desired, for ease of transportation.

It will be appreciated that many modifications may be made in the design and/or construction of apparatus in accordance with the invention. For example, the inner and outer shafts 18 and 19 may be fixed to the end plates 12 and the chain sprockets 22 and 23 may be rotatably mounted on the fixed shafts.

Further, the chains and sprockets may be replaced by toothed belts and gears or other similar apparatus. Thus, the conveyors on each side may be constructed in any suitable manner provided that each conveyor has longitudinally extending conveyor means which are movable in a direction transverse to the apparatus and are able to engage with the hay bale to strip hay therefrom during movement.

Figure 3:
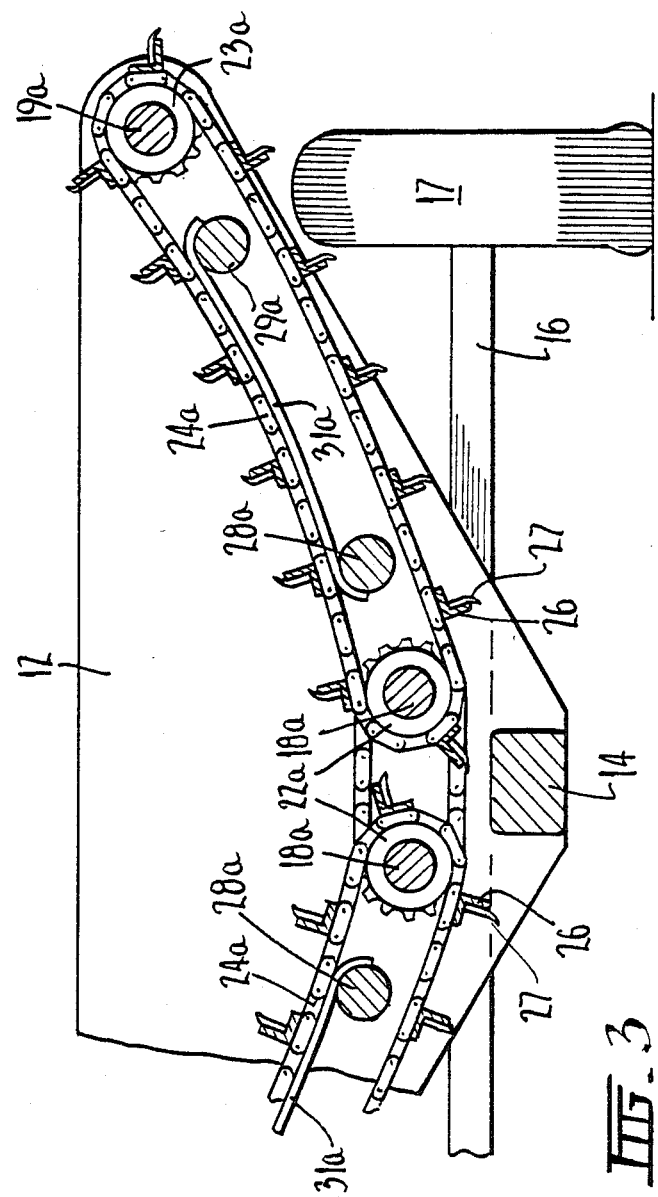
FIG. 3 is an enlarged partial end view of a modified form of apparatus.

Referring to FIG. 3, a modified form of apparatus is illustrated in which the endless chains 24a are caused to move in a curved path between the respective inner and outer shafts 18a and 19a.

The chains 24a are guided along the curved paths by curved guide plates 31a which are mounted to, and extend between upper and lower guide support bars 28a and 29a extending between the end plates.

Naturally, the guide plates 31a on both sides of the apparatus are curved similar amounts, and the curved configuration assists in supporting hay bales in the cradle. The slack in the respective chains 24a, produced when the driving movement tensions and tends to straighten the upper chain run, is minimised to avoid the chain being disengaged from the respective sprockets 22a and 23a. If desired, the guide plates 31a may include spring biased chain tensioners to maintain a minimum predetermined chain tension.

The apparatus of the present invention has particular advantage in being able to distribute hay in a direction transverse of movement of the cradle and towing vehicle. The apparatus is thus able to distribute hay beneath or beside fences, such as electric fences, which can be useful in preventing animals walking on and spoiling the hay.

I claim:

1. A bale feeder comprising a cradle means, support means to support the cradle means above the ground, said cradle means including front and rear walls and two conveyors mounted between the front and rear walls and movable transversely of the cradle, the conveyors being angularly disposed relative to each other and defining an included angle of between about 110° and 140°, the conveyors each extending at approximately the same angle to a horizontal plane, each conveyor comprising upper and lower longitudinal shafts, a pair of endless chain or belt means engaged on sprockets or pulleys on the shafts, a plurality of slat means carried by the pair of chain or belt means and extending longitudinally of the cradle, and flail means on at least some of the slat means to engage the surface of a bale carried in the cradle, the lower shafts of each conveyor being spaced apart a distance of between about 150 mm and 500 mm, an endless chain interconnecting aligned sprockets on the lower shafts and reversible drive means for driving one of the lower shafts to thereby cause both conveyors to move in the same lateral direction and at the same speed whereby the bale of hay carried in the cradle is supported by the two conveyors and movement of the conveyors rotates the bale while the flail means act to tear hay from the bale.

2. A bale feeder as claimed in claim 1 wherein said support means comprises a pair of wheels mounted on the other end of the cradle means.

3. A bale feeder as claimed in claim 1 wherein said slat means comprises a plurality of longitudinally extending metal angle members mounted on links of the chains.

4. A bale feeder as claimed in claim 1 wherein said upper and lower shafts rotate in bearings carried by the front and rear walls forming the ends of said cradle means.

5. A bale feeder as claimed in claim 1 wherein said reversible drive means includes a hydraulic motor drivingly connected to one of said shafts.

6. A bale feeder as claimed in claim 1 wherein said flail means comprises a plurality of spikes fixed to each said slat means and extending outwardly away from the chain or belt means.

7. A bale feeder as claimed in claim 1 wherein guide means are positioned below and adjacent an upper run portion of each said chain or belt means to support and guide said upper run portion thereof.

8. A bale feeder as claimed in claim 7 wherein each said guide means comprises a plate having an upper end disposed adjacent the respective upper shaft means and a lower end disposed adjacent the respective lower shaft means.

9. A bale feeder as claimed in claim 7 wherein each said guide means is curved between an upper and lower end thereof to guide said chain or belt means to move along a curved path.

10. A bale feeder as claimed in claim 7 wherein said lower shaft means of each conveyor means are spaced apart a distance of between 300 mm and 400 mm.

* * * * *